United States Patent
Park

(10) Patent No.: US 11,150,151 B2
(45) Date of Patent: Oct. 19, 2021

(54) METHOD AND DEVICE FOR MONITORING CHAIN TENSION

(71) Applicant: Otis Elevator Company, Farmington, CT (US)

(72) Inventor: Chan-Jong Park, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/717,829

(22) Filed: Dec. 17, 2019

(65) Prior Publication Data

US 2020/0200628 A1 Jun. 25, 2020

(30) Foreign Application Priority Data

Dec. 19, 2018 (EP) ..................................... 18213959

(51) Int. Cl.
*B66B 25/00* (2006.01)
*G01L 5/06* (2006.01)
(Continued)

(52) U.S. Cl.
CPC ................ *G01L 5/06* (2013.01); *B66B 23/02* (2013.01); *B66B 25/006* (2013.01); *F16H 7/08* (2013.01);
(Continued)

(58) Field of Classification Search
CPC ....... B66B 23/024; B66B 23/16; B66B 23/18; B66B 25/006; F16H 7/06; F16H 2007/0876; G01L 5/06; G01L 5/042
(Continued)

(56) References Cited

U.S. PATENT DOCUMENTS 2,985,027 A * 5/1961 Murray ................. F16H 7/1263
  474/138
3,054,299 A * 9/1962 Procter ................. F16H 7/1263
  474/138
(Continued)

FOREIGN PATENT DOCUMENTS

CN  106335837 B  7/2015
CN  105784241 B  4/2018
(Continued)

OTHER PUBLICATIONS

European Search Report for application EP 18213959.2, dated Jul. 5, 2019, 25 pages.
(Continued)

*Primary Examiner* — Joseph A Dillon, Jr.
(74) *Attorney, Agent, or Firm* — Cantor Colburn LLP

(57) ABSTRACT

Chain tension monitoring device (40) is configured for monitoring a chain tension force ($F_C$) of a drive chain (27) extending in a longitudinal direction forming closed loop between two sprockets (26, 28). The chain tension monitoring device (40) comprises a sensor device (41) configured for mechanically contacting the drive chain (27), detecting movement of the drive chain (27) transversely, in particular orthogonally, to the longitudinal direction of the drive chain (27), and providing a detection signal indicating the detected movement of the drive chain (27); and an evaluator (50) configured for receiving the detection signal provided by the sensor device (41) and determining a chain tension force ($F_C$) of the drive chain (27) from said detection signal.

13 Claims, 3 Drawing Sheets

(51) Int. Cl.
*B66B 23/02* (2006.01)
*F16H 7/08* (2006.01)
*G06F 17/14* (2006.01)
*G06F 17/13* (2006.01)

(52) U.S. Cl.
CPC .... *G06F 17/142* (2013.01); *F16H 2007/0876* (2013.01); *G06F 17/13* (2013.01)

(58) Field of Classification Search
USPC ......... 198/330, 331, 781.05, 781.06, 781.11, 198/832; 474/136, 137, 138, 152, 165
See application file for complete search history.

(56) References Cited

U.S. PATENT DOCUMENTS

| | | | | |
|---|---|---|---|---|
| 3,413,866 A * | 12/1968 | Ford | | F16H 7/1272 474/138 |
| 3,675,482 A * | 7/1972 | Hewitt | | G01L 5/04 73/862.471 |
| 3,945,264 A * | 3/1976 | Falkenberg | | A47H 3/08 474/138 |
| 4,082,173 A * | 4/1978 | Simon-Kochloffel | | B66B 23/028 198/330 |
| 4,193,254 A * | 3/1980 | Fusaroli | | D01H 1/241 474/138 |
| 4,466,802 A * | 8/1984 | Ojima | | F16H 7/0848 188/196 F |
| 4,499,971 A * | 2/1985 | Luebrecht | | B66F 17/003 182/148 |
| 4,657,131 A | 4/1987 | Brychta et al. | | |
| 4,826,470 A * | 5/1989 | Breon | | F16H 7/08 474/110 |
| 4,993,993 A * | 2/1991 | Gill | | F16H 7/1263 474/111 |
| 5,143,206 A * | 9/1992 | Hoover | | B65G 43/02 198/810.04 |
| 5,720,683 A * | 2/1998 | Patton | | F16H 7/08 474/109 |
| 5,951,423 A * | 9/1999 | Simpson | | F16H 7/0834 474/109 |
| 6,137,974 A * | 10/2000 | Williams | | G03G 15/754 198/810.04 |
| 6,358,169 B1 * | 3/2002 | Markley | | F02B 67/06 474/111 |
| 6,435,035 B1 * | 8/2002 | Kubsik | | B65G 23/14 73/828 |
| 6,726,532 B2 * | 4/2004 | Lin | | B24B 21/20 198/813 |
| 6,852,050 B2 * | 2/2005 | Sands | | B65G 39/16 198/810.03 |
| 7,140,486 B2 * | 11/2006 | Kim | | F16H 7/08 198/810.03 |
| 7,837,021 B2 | 11/2010 | Ichikawa et al. | | |
| 8,061,510 B2 | 11/2011 | Tout | | |
| 8,931,628 B2 | 1/2015 | Hill | | |
| 10,118,802 B2 | 11/2018 | Borthakur et al. | | |
| 10,654,656 B2 * | 5/2020 | Mader | | G01L 5/107 |
| 10,850,947 B2 * | 12/2020 | Park | | B66B 23/14 |
| 2005/0187053 A1 | 8/2005 | Kim | | |
| 2005/0274197 A1 * | 12/2005 | Le | | G01L 5/042 73/801 |
| 2007/0270261 A1 * | 11/2007 | Sakura | | F16H 7/06 474/231 |
| 2008/0102999 A1 * | 5/2008 | Yang | | F16H 7/1254 474/110 |
| 2011/0220699 A1 | 9/2011 | Ehrmann et al. | | |
| 2014/0309882 A1 * | 10/2014 | Antchak | | F16H 7/12 701/36 |
| 2015/0266682 A1 * | 9/2015 | Takagi | | B41J 13/03 271/264 |
| 2015/0276522 A1 * | 10/2015 | Miyata | | G01H 13/00 73/862.41 |
| 2017/0297874 A1 | 10/2017 | Borthakur et al. | | |
| 2017/0350475 A1 * | 12/2017 | Ziegler | | F16H 7/14 |
| 2018/0057315 A1 * | 3/2018 | Park | | B66B 27/00 |
| 2018/0120180 A1 | 5/2018 | Zhu et al. | | |
| 2018/0209516 A1 * | 7/2018 | Lapp | | F16H 7/06 |
| 2018/0339885 A1 * | 11/2018 | Park | | F16H 7/06 |
| 2019/0071286 A1 * | 3/2019 | Dong | | B66B 23/20 |
| 2019/0112161 A1 * | 4/2019 | Park | | B66B 23/04 |
| 2019/0352140 A1 * | 11/2019 | Park | | B66B 25/006 |
| 2020/0031630 A1 * | 1/2020 | Park | | B66B 23/02 |
| 2020/0032883 A1 * | 1/2020 | Chinnel | | G01L 5/105 |
| 2020/0055710 A1 * | 2/2020 | Hashioka | | B66B 29/00 |
| 2020/0056536 A1 * | 2/2020 | Heckel | | F02B 63/042 |
| 2020/0087116 A1 * | 3/2020 | Cai | | B66B 23/24 |

FOREIGN PATENT DOCUMENTS

| | | |
|---|---|---|
| DE | 10322955 B4 | 9/2006 |
| EP | 1850087 A1 | 10/2007 |
| EP | 3191395 A1 | 7/2017 |
| JP | H08198573 A | 8/1996 |
| JP | 2000143136 A | 5/2000 |
| JP | 2005029362 A | 2/2005 |
| JP | 2006273549 A | 10/2006 |
| JP | 2016183034 AS | 10/2016 |
| KR | 101096780 B1 | 12/2011 |

OTHER PUBLICATIONS

Tsutada, Hiroyuki, et al., "Chain Fault Detection of Escalator Using Handrail Vibration", ICSV14, 14th International Congress on Sound & Vibration, Jul. 9-12, 2007, 7 pages.

* cited by examiner

METHOD AND DEVICE FOR MONITORING CHAIN TENSION

FOREIGN PRIORITY

This application claims priority to European Patent Application No. 18213959.2, filed Dec. 19, 2018, and all the benefits accruing therefrom under 35 U.S.C. § 119, the contents of which in its entirety are herein incorporated by reference.

BACKGROUND

The invention relates to a device and to a method for monitoring a chain tension force of a drive chain, in particular of a drive chain of a people conveyor. The invention further relates to a people conveyor comprising such a device. In the following, such a device is called "chain tension monitoring device".

People conveyors such as escalators and moving walkways comprise a band of conveyance elements, such as steps or pallets, moving in a longitudinal conveyance direction. The conveyance elements are connected with and driven by an endless conveyance chain. The conveyance chain may be driven by a people conveyor drive via a drive chain.

A correct chain tension force of said drive chain is essential for a proper operation of the people conveyor.

It therefore is desirable to provide a method and a device which allow monitoring the chain tension force of the drive chain, in particular continuously monitoring the chain tension force of the drive chain during operation of the people conveyor.

SUMMARY

According to an exemplary embodiment of the invention, a chain tension monitoring device is configured for monitoring a chain tension force of a drive chain extending in a longitudinal conveyance direction forming a closed loop between two sprockets. The chain tension monitoring device comprises a sensor device and an evaluator. The sensor device is configured for mechanically contacting the drive chain, detecting movement of the drive chain in a direction oriented transversely, in particular orthogonally, to the longitudinal direction of the drive chain, and providing a detection signal indicating the detected movement of the drive chain. The evaluator is configured for receiving the detection signal provided by the sensor device and determining a chain tension force of the drive chain from said detection signal.

According to an exemplary embodiment of the invention, a method of monitoring a chain tension force of a drive chain extending in a longitudinal direction forming a closed loop between two sprockets, comprises detecting a movement of the chain in a direction oriented transversely, in particular orthogonally, to the longitudinal direction of the drive chain, providing a detection signal indicating the detected movement of the drive chain and determining the chain tension force of the drive chain from said detection signal.

Exemplary embodiments of the invention also include a people conveyor, in particular an escalator or a moving walkway, comprising a drive chain and a chain tension monitoring device according to an exemplary embodiment of the invention.

Exemplary embodiments of the invention allow monitoring the chain tension force of a drive chain conveniently and reliably, in particular during operation. In consequence, a suitable chain tension force of the drive chain may be ensured, and operating a people conveyor with a wrong chain tension force of the drive chain, in particular with a too low chain tension force, may be avoided.

Maintaining a correct chain tension force of the drive chain allows a smooth operation of the people conveyor resulting in good ride quality, low noise and long lifetime of the people conveyor, in particular of its drive chain.

A number of optional features are set out in the following. These features may be realized in particular embodiments, alone or in combination with any of the other features.

The sensor device may comprise a movable element, such as a sliding shoe, which is movable transversely, in particular orthogonally, to the longitudinal direction of the drive chain, and which is configured for contacting the drive chain.

The sensor device may comprise an elastic element configured for urging the movable element against the drive chain and/or an accelerometer configured for detecting movement of the movable element transversely, in particularly orthogonally, to the longitudinal direction, and providing a corresponding signal which may be used as the detection signal.

Such a mechanical sensor device provides a cheap and reliable sensor device capable of detecting movement of the drive chain in a transverse direction, in particular in a direction oriented orthogonally to the longitudinal direction of the drive chain.

The evaluator may be configured for determining at least one frequency of the detected movement in order to determine the chain tension force of the drive chain from said at least one frequency.

The evaluator in particular may be configured for determining the current chain tension force $F_C$ of the drive chain employing the formula:

$$F_c = \left(\frac{2L}{C_r} \times \frac{f}{k}\right)^2 \times m - r^2 \times \omega^2 \times m$$

wherein: L is the distance between the two sprockets, k is the mode number of chordal vibration, f is the chordal frequency of the respective mode, ω is the rotational speed of one of the sprockets, r is the pitch diameter of the respective sprocket, m is the mass per unit chain length, and $C_r$ is a resonance factor of the drive chain, which may be determined experimentally.

Applying said formula allows for a reliable determination of the chain tension force of the drive chain with high accuracy.

The at least one frequency may be determined by applying a Fast-Fourier-Transformation (FFT) to the detection signal provided by the sensor device, in particular a detection signal representing the varying position of the movable element as a function of time. A Fast-Fourier-Transformation provides a fast and well-established way of determining at least one frequency of a signal.

The chain tension monitoring device may further comprise a controller configured for comparing the chain tension force determined by the evaluator with a predefined lower limit and issuing an alarm signal in case the chain tension force determined by the evaluator is smaller than the predefined lower limit.

The chain tension monitoring device may also comprise a controller configured for comparing the chain tension force determined by the evaluator with a predefined upper limit and issuing an alarm signal in case the chain tension force determined by the evaluator exceeds the predefined upper limit.

Such a controller allows notifying service personnel and/or stopping operation of the people conveyor in case the chain tension force of the drive chain drops below the predefined lower limit or exceeds the predefined upper limit. This avoids operating the people conveyor over an extended period of time with a chain tension force of the drive chain which is too small or too large. Operating the people conveyor with a wrong chain tension force over an extended period of time increases the wear of at least some components of the people conveyor and reduces the riding comfort for the passengers. It even might cause damage of components of the people conveyor.

A chain tension monitoring device according to an embodiment of the invention may further comprise a tensioning mechanism coupled with the controller and configured for adjusting, i.e. increasing or decreasing, the chain tension force of the drive chain when an alarm signal is issued because the determined chain tension force falls below the lower limit or exceeds the upper limit.

Such a configuration allows automatically compensating for a wrong chain tension force without stopping the operation of the people conveyor. It further avoids the need for a mechanic to visit the people conveyor in order to adjust the chain tension force.

A people conveyor according to an exemplary embodiment of the invention may be an escalator, in which the conveyance elements are steps.

Alternatively, the people conveyor may be a moving walkway, in which the conveyance elements are pallets. In case of a moving walkway, the band of conveyance elements (pallets) may be inclined with respect to the horizontal, or it may extend horizontally.

DRAWING DESCRIPTION

In the following exemplary embodiments of the invention are described with reference to the enclosed figures.

DETAILED DESCRIPTION

Figure 1:
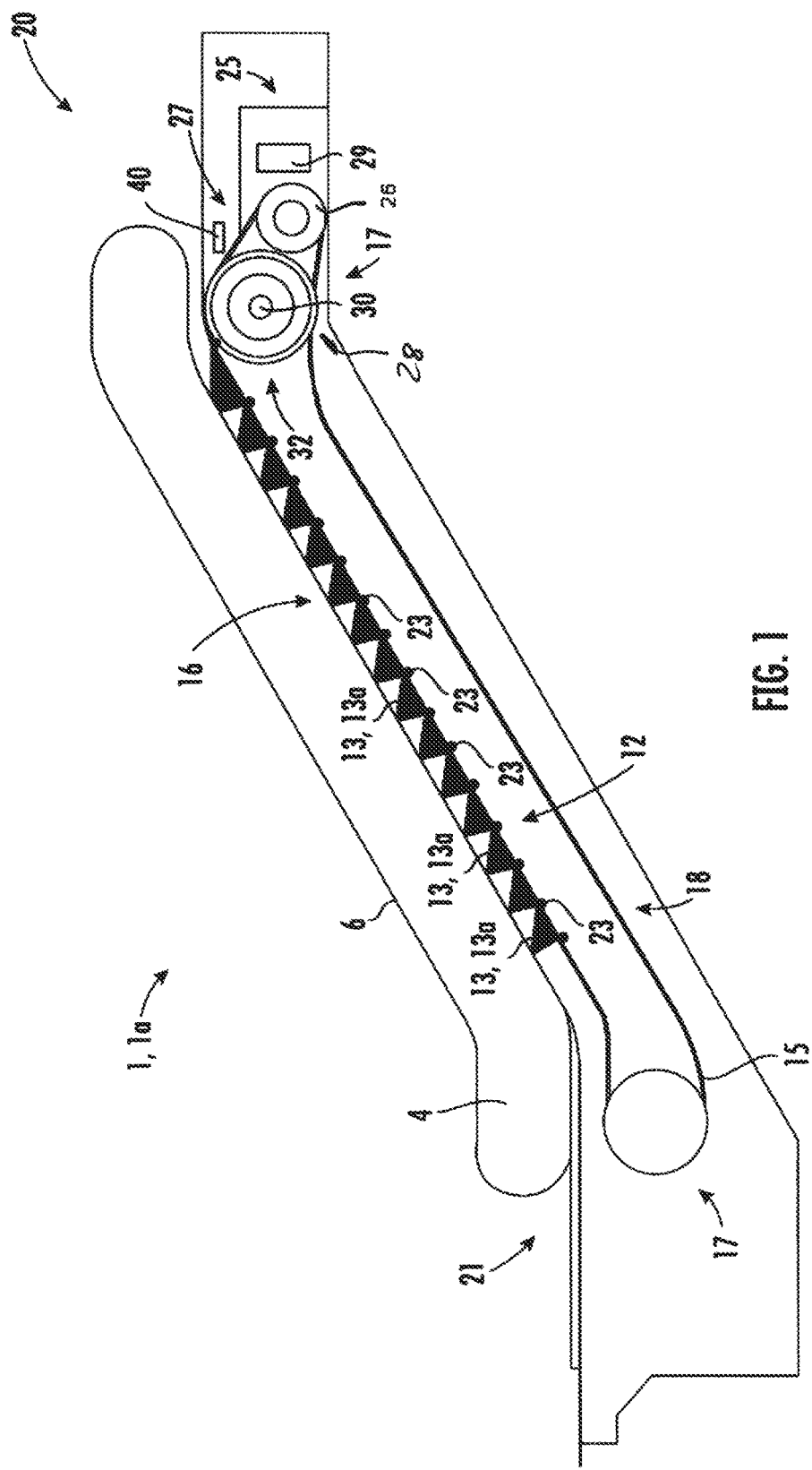
FIG. 1 depicts a schematic side view of an escalator.

FIG. 1 shows a schematic side view of a people conveyor 1, in particular an escalator 1a, comprising a band 12 of conveyance elements 13 (steps 13a) extending in a longitudinal conveyance direction between two landing portions 20, 21. The conveyance elements 13 comprise rollers 23 guided and supported by guide rails (not shown). For clarity, only some of the conveyance elements 13 are depicted in FIG. 1, and not all conveyance elements 13/rollers 23 are provided with reference signs.

In turnaround portions 17 next to the landing portions 20, 21, the band 12 of conveyance elements 13 passes from a conveyance portion 16 into a return portion 18, and vice versa. A conveyance chain 15 extending along a closed loop is connected to the band 12 of conveyance elements 13. Balustrades 4 supporting moving handrails 6 extend parallel to the conveyance portion 16.

The conveyance chain 15 is configured for driving the band 12 of conveyance elements 13. The conveyance chain 15 is driven by a conveyance chain sprocket 32 mounted to a rotating shaft 30.

Figure 2:
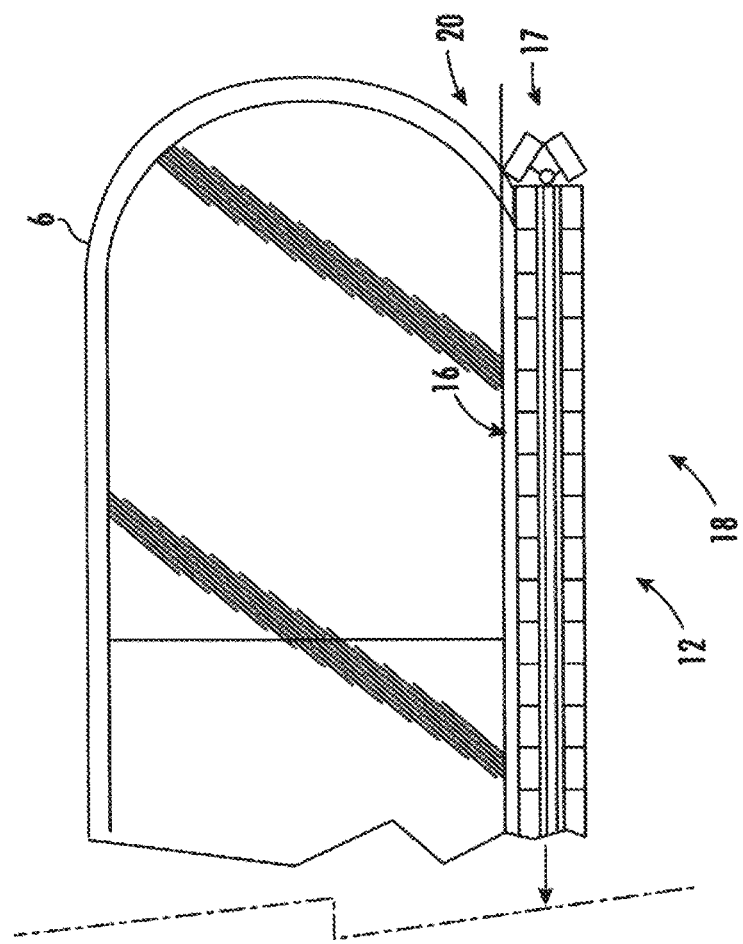
FIG. 2 depicts a schematic side view of a moving walkway.
Figure 2:
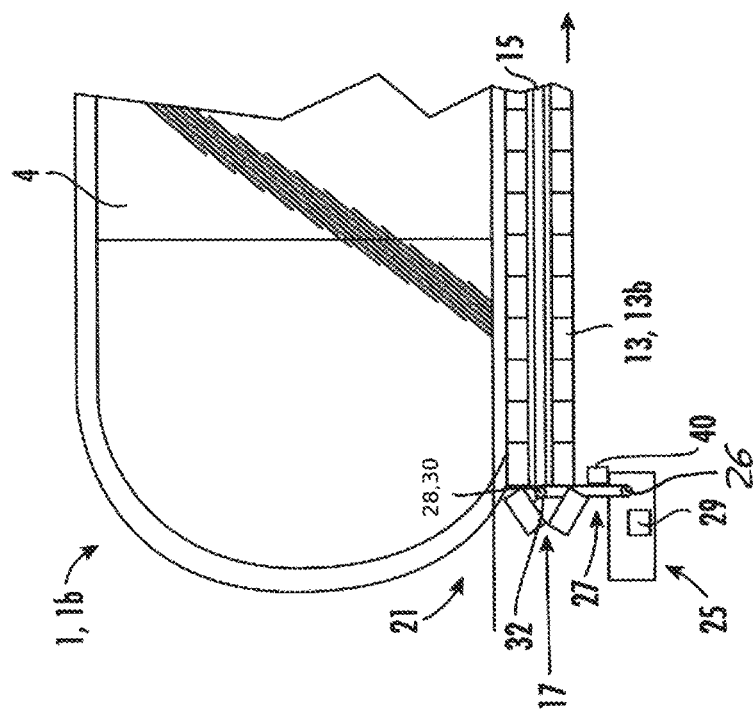

FIG. 2 depicts a schematic side view of a people conveyor 1, which is provided as a moving walkway 1b.

The moving walkway 1b comprises an endless band 12 of conveyance elements 13 (pallets 13b) moving in a longitudinal conveyance direction in an upper conveyance portion 16 and opposite to the conveyance direction in a lower return portion 18. Landing portions 20, 21 are provided at both ends of the moving walkway 1b. In turnaround portions 17 next to the landing portions 20, 21 the band 12 of conveyance elements 13 passes from the conveyance portion 16 into the return portion 18, and vice versa. Balustrades 4 supporting moving handrails 6 extend parallel to the conveyance portion 16.

Similar to the embodiment shown in FIG. 1, the band 12 of conveyance elements 13 is connected with an endless conveyance chain 15. In at least one of the turnaround portions 17, the endless conveyance chain 15 is in engagement with a conveyance chain sprocket 32.

In both configurations depicted in FIGS. 1 and 2, the people conveyor 1 further comprises a people conveyor drive 25 including a motor 29, which is configured for driving a drive sprocket 26 (not shown in FIG. 2).

A drive chain 27 acting as a transmission element engages with said drive sprocket 26 and a driven sprocket 28 mounted to the rotating shaft 30 for rotating integrally with the conveyance chain sprocket 32. Optionally, the driven sprocket 28 and the conveyance chain sprocket 32 may be formed integrally as a single sprocket comprising two different rims, a first rim corresponding to the conveyance chain sprocket 32 and a second rim corresponding to the driven sprocket 28, respectively.

As a result, the conveyance chain sprocket 32 may be driven by the motor 29 of the people conveyor drive 25 via a mechanical connection provided by the drive sprocket 26, the drive chain 27, and the driven sprocket 28.

Two or all three sprockets 26, 28, 32 may have the same diameter/number of teeth, or the diameters/numbers of teeth of the sprockets 26, 28, 32 may be different.

In both configurations depicted in FIGS. 1 and 2, a chain tension monitoring device 40 according to an exemplary embodiment of the invention is arranged next to the drive chain 27.

Figure 3:
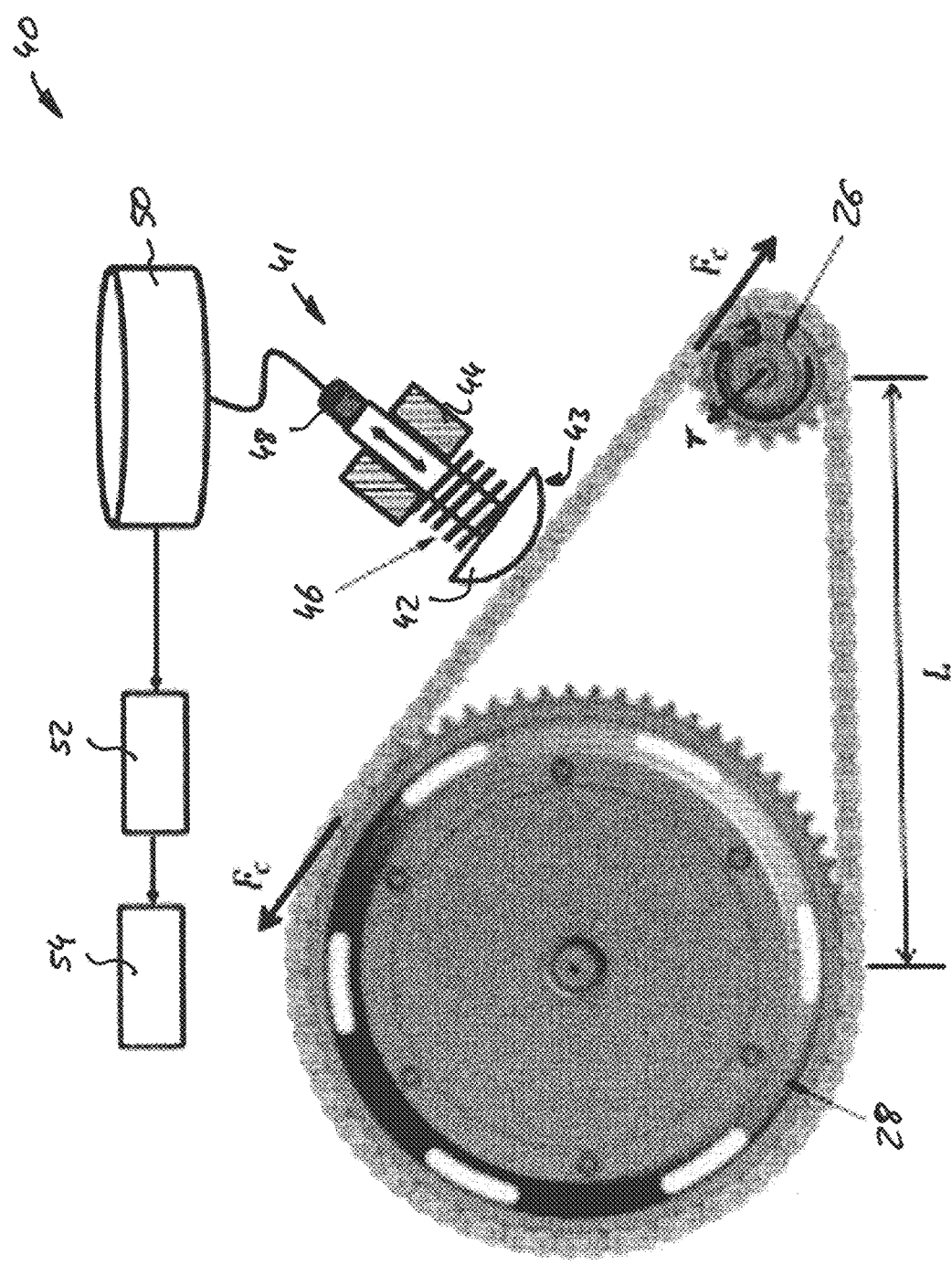
FIG. 3 depicts an enlarged side view of a transmission element and a chain tension monitoring device according to an exemplary embodiment of the invention.

FIG. 3 depicts an enlarged side view of the drive sprocket 26, the driven sprocket 28, the drive chain 27 extending between and engaging with the two sprockets 26, 28. FIG. 3 further depicts a chain tension monitoring device 40 according to an exemplary embodiment of the invention.

The chain tension monitoring device 40 comprises a sensor device 41 with a movable element 42, such as a sliding shoe. The movable element 42 is supported by a guide 44 in a configuration allowing the movable element 42 to move, in particular to shift or slide, transversely, in particular orthogonally, to the longitudinal moving direction of the drive chain 27.

The sensor device 41 further comprises an elastic element 46, such as a spring, configured for urging the movable element 42 against the drive chain 27. As a result, the position of the movable element 42 with respect to the guide 44 is determined by the interaction between the urging force applied by the elastic element 46 and the chain tension force $F_C$ of the drive chain 27.

The portion of the movable element 42 contacting the drive chain 27 may be covered with a coating 43, such as a coating 43 including Teflon® or a similar material, configured for reducing the wear and the friction between the movable element 42 and the drive chain 27 passing along the outer surface of the movable element 42.

The movable element 42 is mechanically coupled with a motion sensor 48, in particular with an accelerometer. The motion sensor 48 is configured for detecting any movement of the movable element 42 transversely, in particular orthogonally, to the longitudinal moving direction of the drive chain 27 and for generating a corresponding detection signal.

The detection signal generated by the motion sensor (accelerometer) 48 is supplied to an evaluator 50.

The evaluator 50 is configured for calculating at least one frequency f of the movement of the movable element 42. The evaluator 50 in particular may perform a Fourier-Transformation of the detection signal provided by the motion sensor (accelerometer) 48. Such a Fourier-Transformation in particular may be implemented as a Fast-Fourier-Transformation (FFT).

The chain tension force $F_C$ of the drive chain 27 may be calculated from said at least one frequency f using the formula:

$$F_c = \left(\frac{2L}{C_r} \times \frac{f}{k}\right)^2 \times m - r^2 \times \omega^2 \times m$$

In said formula, L is the distance between the two sprockets 26, 28, k is the mode number of chordal vibration, f is the chordal frequency of the respective mode, m is the mass per unit chain length, $\omega$ is the rotational speed of one of the sprockets 26, 28, r is the pitch diameter of the respective sprocket 26, 28, and $C_r$ is a resonance factor of the drive chain 27, which may be determined experimentally.

It is noted that the product $\omega \times r$ employed in the formula is identical for both sprockets 26, 28. Thus, the rotational speed $\omega$ and the pitch diameter r of any of the two sprockets 26, 28 may be used for the calculation, even if the pitch diameters r of the two sprockets 26, 28 are different, as long as the rotational speed $\omega$ and the pitch diameter r of the same sprocket 26, 28 are used.

Usually, the first chordal frequency f (k=1) is used, which in the case of a people conveyor usually is less than 1 Hz. However chordal frequencies f of higher order (k>1) may be used as well.

The chain tension monitoring device 40 further comprises a controller 52, which is configured for comparing the calculated chain tension force $F_C$ with a predefined lower limit $F_{low}$. In case the calculated chain tension force $F_C$ is smaller than said predefined lower limit $F_{low}$ ($F_C<F_{low}$), the chain tension force $F_C$ is considered as being too low and the controller 52 is configured to issue an alarm signal.

Alternatively or additionally, the controller 52 additionally may be configured for detecting and indicating a too large chain tension force $F_C$, i. e. a chain tension force $F_C$ exceeding a predefined upper limit $F_{high}$ ($F_C>F_{high}$).

The alarm signal issued by the controller 52 may cause the motor 29 of people conveyor drive 25 to stop in order to avoid a malfunction of the people conveyor 1 and/or damage of the transmission element 27 and/or of the sprockets 26, 28, as it may be caused by a wrong chain tension force $F_C$.

Optionally, the people conveyor 1 may comprise a tensioning mechanism 54 configured for adjusting the chain tension force $F_C$, e.g. by moving at least one of the sprockets 26, 28 in the longitudinal direction. In such a configuration, the alarm signal issued by the controller 52 may trigger the tensioning mechanism 54 to adjust the chain tension force $F_C$.

The tensioning mechanism 54 in particular may be configured for adjusting the chain tension force $F_C$ as long as an alarm signal is issued, i.e. as long as the detected chain tension force $F_C$ is smaller than the predefined lower limit $F_{low}$, or larger than the predefined upper limit $F_{high}$, respectively.

Such a configuration allows automatically adjusting the chain tension force $F_C$, thereby preventing undesirable down-times of the people conveyor 1 after a wrong chain tension force $F_C$ has been detected.

In case the tensioning mechanism 54 does not succeed in increasing the chain tension force $F_C$ at least to the predefined lower limit $F_{low}$, or decreasing the chain tension force $F_C$ at least to the predefined upper limit $F_{high}$, within a predetermined amount of time, further operation of the people conveyor drive 25 may be stopped and a mechanic may be requested to visit the people conveyor 1 in order to fix the problem.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES 1 people conveyor
1a escalator
1b moving walkway
4 balustrade
6 moving handrail
12 band of conveyance elements
13 conveyance elements
13a steps
13b pallets
15 conveyance chain/first drive chain
16 conveyance portion
17 turnaround portion
18 return portion
20, 21 landing portions
23 rollers
25 people conveyor drive
26 drive sprocket
27 transmission element/second drive chain
28 driven sprocket
29 motor
30 rotating shaft
32 conveyance chain sprocket
40 chain tension monitoring device
41 sensor device
42 movable element/sliding shoe
43 coating
44 guide
46 elastic element/spring
48 motion sensor/accelerometer
50 evaluator
52 controller 54 tensioning mechanism
$C_r$ resonance factor of the drive chain
$F_C$ chain tension force
$F_{high}$ upper limit of the chain tension force
$F_{low}$ lower limit of the chain tension force
f chordal frequency
k mode number of chordal vibration
L distance between the sprockets
m mass per unit chain length,
r pitch diameter
ω rotational speed

What is claimed is:

1. Chain tension monitoring device configured for monitoring a chain tension force ($F_C$) of a drive chain extending in a longitudinal direction forming a closed loop between two sprockets, the chain tension monitoring device comprising:
 a sensor device configured for mechanically contacting the drive chain, detecting a movement of the drive chain transversely to the longitudinal direction of the drive chain, and providing a detection signal indicating the detected movement of the drive chain; and
 an evaluator configured for receiving the detection signal provided by the sensor device, determining at least one frequency (f) of the detected movement from said detection signal and determining a chain tension force ($F_C$) of the drive chain from the at least one frequency (f).

2. Chain tension monitoring device according to claim 1, wherein the evaluator is configured for determining the at least one frequency (f) of the detected movement, by employing a Fast-Fourier-Transformation.

3. Chain tension monitoring device according to claim 2, wherein the evaluator is configured for determining the current chain tension force ($F_C$) of the drive chain employing the formula:

$$F_c = \left(\frac{2L}{C_r} \times \frac{f}{k}\right)^2 \times m - r^2 \times \omega^2 \times m$$

wherein:
 $C_r$ is a resonance factor of the drive chain,
 L is the distance between the two sprockets,
 k is the mode number of chordal vibration,
 f is the chordal frequency of the respective mode,
 ω is the rotational speed of one of the sprockets,
 r is the pitch diameter of the respective sprocket, and
 m is the mass per unit chain length.

4. Chain tension monitoring device according to claim 1, wherein the sensor device comprises
 a movable element which is configured for contacting the drive chain, and which is movable perpendicularly to the longitudinal direction of the drive chain.

5. Chain tension monitoring device according to claim 4, comprising
 an elastic element configured for urging the movable element against the drive chain.

6. Chain tension monitoring device according to claim 4, comprising a motion sensor configured for detecting a movement of the movable element transversely to the longitudinal direction of the drive chain, and providing a corresponding detection signal.

7. Chain tension monitoring device according to claim 1, further comprising a controller configured for comparing the chain tension force ($F_C$) determined by the evaluator with a predefined lower limit ($F_{low}$) and/or with a predefined upper limit ($F_{high}$) and issuing an alarm signal in case the chain tension force ($F_C$) determined by the evaluator is smaller than the predefined lower limit ($F_{low}$) or in case the chain tension force ($F_C$) determined by the evaluator is larger than the predefined lower limit ($F_{high}$).

8. Chain tension monitoring device according to claim 7 further comprising a tensioning mechanism coupled with the controller and configured for adjusting the chain tension force ($F_C$) of the drive chain when an alarm signal is issued.

9. People conveyor comprising a drive chain and a chain tension monitoring device according to claim 1.

10. Chain tension monitoring device according to claim 4, wherein the movable element comprises a sliding shoe.

11. Chain tension monitoring device according to claim 5, wherein the elastic element comprises a spring.

12. Chain tension monitoring device according to claim 6, wherein the motion sensor is configured for detecting the movement of the movable element orthogonally to the longitudinal direction of the drive chain.

13. Chain tension monitoring device according to claim 1, wherein the chain tension force ($F_C$) is determined as a function of (i) the at least one frequency (f), (ii) a distance (L) between the two sprockets and (iii) a rotational speed (ω) of at least one of the two sprockets.

* * * * *